Aug. 5, 1969 W. R. HEFFERNAN 3,459,359
COMPOSITE PLASTIC AND FLEXIBLE PANEL CONTAINER
Filed March 2, 1967 2 Sheets-Sheet 1
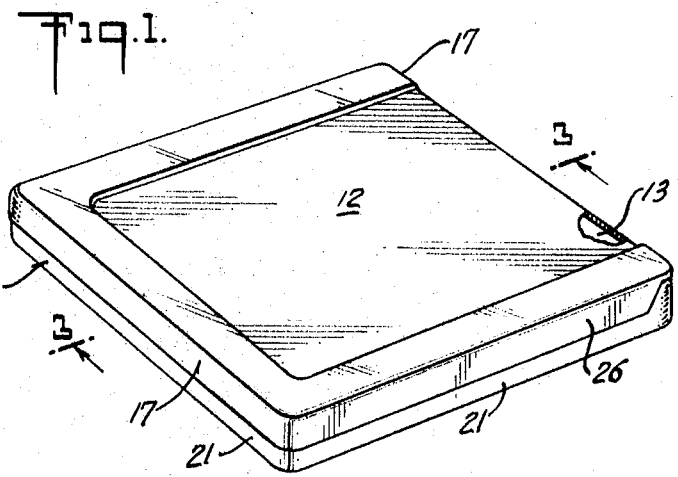
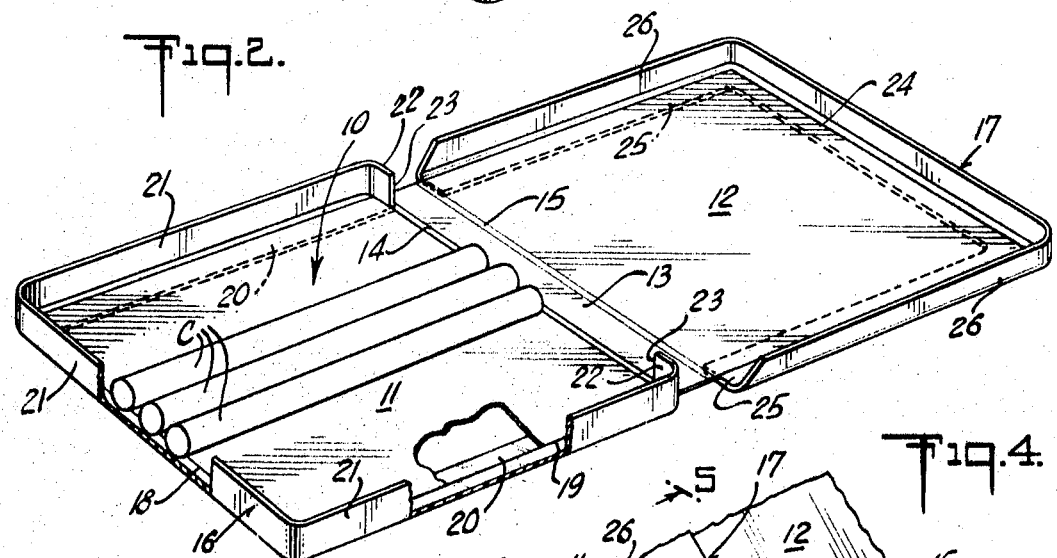
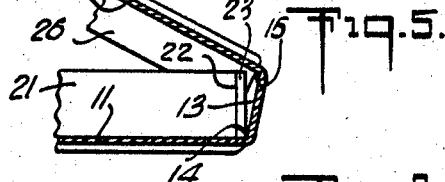
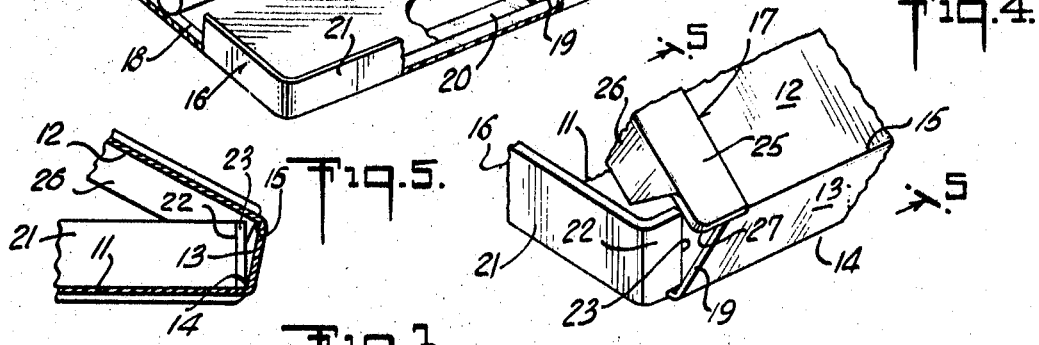
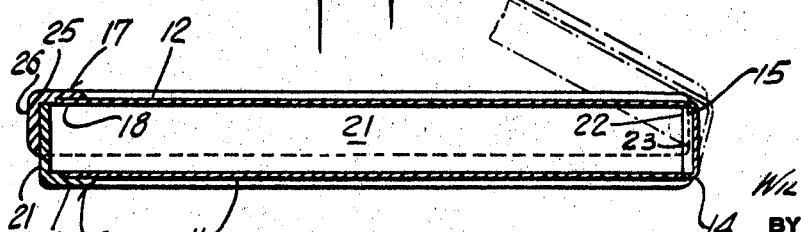
INVENTOR
WILLIAM R. HEFFERNAN
BY
Arnold J. Worfolk
ATTORNEY Aug. 5, 1969  W. R. HEFFERNAN  3,459,359
COMPOSITE PLASTIC AND FLEXIBLE PANEL CONTAINER
Filed March 2, 1967  2 Sheets-Sheet 2
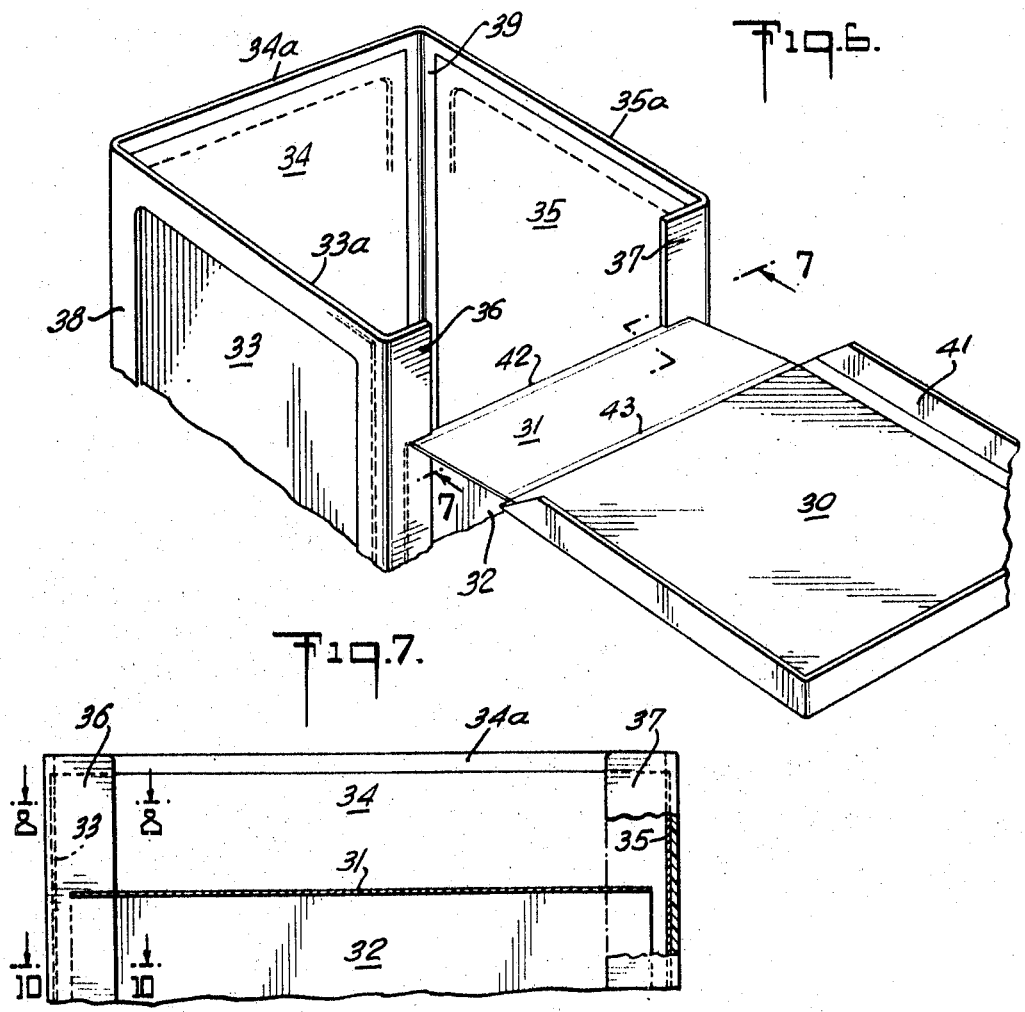
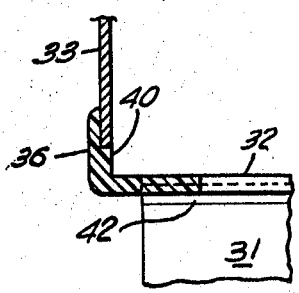
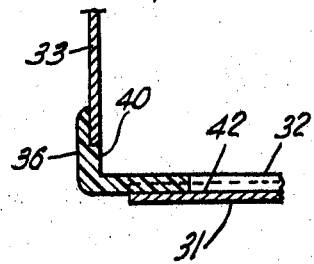
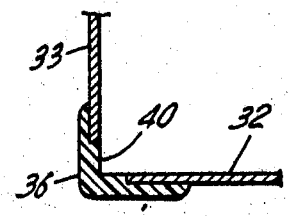
INVENTOR
WILLIAM R. HEFFERNAN
BY
Arnold J. Worfolk
ATTORNEY United States Patent Office 3,459,359
Patented Aug. 5, 1969

3,459,359
COMPOSITE PLASTIC AND FLEXIBLE PANEL CONTAINER
William R. Heffernan, Westfield, N.J., assignor to Johnson & Johnson, a corporation of New Jersey
Filed Mar. 2, 1967, Ser. No. 620,088
Int. Cl. B65d 5/66, 1/00
U.S. Cl. 229—44                                2 Claims

ABSTRACT OF THE DISCLOSURE

A composite plastic and flexible panel container of the general type disclosed in U.S. Patent 3,119,540 is formed with a receptacle portion and captive lid portion made from a unitary blank of flexible sheet material with the receptacle and lid portions each injection molded with independent plastic frames, and with a paneling section intermediate the receptacle and lid portions devoid of rigid plastic interconnection with the other plastic frames to enable a hinging and relative telescoping action between receptacle and lid and the closing of the receptacle in the vicinity of the intermediate paneling section.

Brief summary of invention

According to the present improvements a portion of a multisectional blank of flexible paneling material is equipped with a rigid plastic frame section injection molded along edges of the paneling to define a receptacle of a given contour at the top. A different portion of the same blank is equipped with a rigid plastic frame section injection molded likewise along edges of the paneling to define a lid portion adapted when the container is closed to telescope relatively with respect to the plastic frame at the top of the receptacle portion. An intermediate paneling section devoid of rigid plastic interconnection with either frame provides a hinged connection enabling the telescoping action. When the lid is in container closing position the intermediate paneling section serves as a portion of at least one wall of the container. Closure of the container at the ends of the intermediate section is effected by its facewise and overlapping engagement with the plastic frame. Opening of the container gives access to the contents of the receptacle below the top edge thereof by a hinged displacement of the wall portion formed by the intermediate panel section, access that otherwise would be denied were such portion of the receptacle wall fixed.

In one disclosed embodiment of the invention the multisectional blank of paneling material is flat during the injection molding operation and the container, when the plastic frames telescope one with respect to the other, is a flat box suitable for relatively long thin objects of square, cylindrical, or other cross sections.

In another disclosed embodiment of the invention the multisectional blank of paneling material is folded to provide vertical paneling sections in the receptacle portion of the container and the plastic frame thereof which telescopes with respect to the lid portion of the container gives shape to the receptacle portion at the top.

Description of drawings

A better understanding of the invention may be had from the following description read in conjunction with the accompanying drawings wherein:

FIG. 1 is a perspective view of a composite container equipped with the present improvements and shown with its lid in closed position;

FIG. 2 is a perspective view of the composite container of FIG. 1 shown with its lid in open position;

FIG. 3 is a longitudinal sectional view on line 3—3 of FIG. 1;

FIG. 4 is a fragmentary perspective view of a rear corner section of the container with its lid shown in a partially opened position;

FIG. 5 is a sectional view on line 5—5 of FIG. 4;

FIG. 6 is a perspective view of a composite container illustrating a different embodiment of the present improvements wherein the receptacle portion of the container is formed with flexible board paneling at the front, the back, the sides, and at the bottom;

FIG. 7 is a sectional view on line 7—7 of FIG. 6;

FIG. 8 is a fragmentary horizontal sectional view through a rear corner of the container taken on line 8—8 of FIG. 7;

FIG. 9 is a fragmentary horizontal sectional view similar to FIG. 8 but with the lid shown closed; and FIG. 10 is a fragmentary horizontal sectional view on line 10—10 of FIG. 7.

Detailed description

In the embodiment of the invention illustrated in FIGS. 1 to 5, a rectangular multisectional blank 10 of flexible sheet material is formed with three sections 11, 12 and 13, one of which (the section 11) in the finished container, is a bottom panel, a second (the section 12), a top panel, and a third (the section 13) an intermediate panel divided from the other two by a pair of parallel score lines 14, 15 between which the intermediate panel 13 is disposed and along which the blank may bend with facility.

In accordance with the methods of U.S. Patent 3,119,-540, supra, plastic reinforcing frames structures 16 and 17 are associated with the bottom panel and the top panel respectively by injection molding. The framework 16 is right angular in cross-section and extends continuously around the three free edges of the panel section 11, i.e. an end edge 18 and side edges 19. One leg 20 of the angular frame member 16 is in a horizontal plane and during the injection molding operation the framework is bonded to the paneling section 11 along the marginal edge thereof. The paneling section 11 constitutes the bottom of the composite container.

The angular plastic frame member 16 has a second leg 21 extending vertically from the container bottom and constituting the sidewall of the receptacle portion of the container. Sidewall 21 extends entirely around the bottom panel section 11 of the receptacle, i.e. along edges 18 and 19 except for that boundary of the panel which terminates at score line 14 dividing it from the intermediate panel section 13. In this region the plastic flanges 21 which ordinarily are disposed parallel to but spaced outwardly from peripheral edge 19 of the blank section 10 have portions 22 extending inwardly toward each other for a short distance beyond the respective lateral edges of the blank. These inwardly extending wall portions 22 terminate each in a vertical edge 23 just inwardly of lateral edges 19 of the blank. The receptacle in the region adjacent the score line 14 is devoid of a plastic wall. The reason for this construction will be evident as the description of the invention proceeds.

The container lid panel section 12 is defined by an end edge 24 of the blank, the score line 15 near the center area 13 of the blank and those portions of lateral edges 19 of the blank which extend between end edge 24 and score line 15. In the manufacture of the container the rigid plastic frame 17 is injection molded around the peripheral edges of the container lid panel section except where it is bounded by score line 15. Rigid plastic frame 17 is right angular in cross-section. It presents one flange 25 disposed in a horizontal plane and bonded to the blank 12 along the marginal area near its periphery during the injection molding process. It has another leg or flange 26 extending at right angles thereto and which is formed during the same molding operation.

The intermediate section 13 of the multisectional paneling blank 10 is defined longitudinal by the spaced parallel score lines 14, 15 which bound the receptacle and lid panel sections 11 and 12 respectively. It is defined at its ends by the lateral edges 19 of the unitary blank.

In order to close the container, the blank is bent upwardly along score line 14 and then forwardly along score line 15 (FIGS. 4 and 5). During bending, the intermediate panel section 13 is moved to a position where marginal portions thereof near end edges 19 overlap and are in facewise contact with the short inwardly extending plastic wall sections 22 which terminate just inwardly from said end edges 19. Continued bending of the blank permits reinforcing flanges 17 and 26 on the lid to telescope over flanges 16 and 21 on the receptacle and the dimensions of such flanges are such that they are in close juxtaposition when the container is closed. When the receptacle is closed, intermediate panel 13 makes a close fit with inwardly extending wall sections 22. Also, at the rear corner locations of the container top horizontal flanges 25 of the lid's plastic structural member 17 seat tightly against the upper edge of the structural member sections 21 associated with the receptacle portion of the container. The upper flange 25, in its rear end portion 27, is formed to follow the corner surface contour of the vertical leg 21 of the plastic structural member section associated with the receptacle portion of the container. The construction just described makes a neat tight seal at the rear corners of the container.

The improved container just described has many uses and it is particularly suitable for relatively long thin objects of square, cylindrical, or other cross sections. When the lid is in open position one end of the contained objects could be exposed to facilitate removal which otherwise might be difficult if such articles are tightly packed.

In the embodiment of the invention illustrated in FIGS. 6 to 10, inclusive, a multisectional blank of flexible sheet material is used which in addition to having a flat top section 30 and intermediate section 31, has four wall sections 32, 33, 34, 35 and a bottom section (not shown). The wall and bottom sections may be folded up about mandrel, for molding in the manner described in U.S. Patent 3,119,540, to produce a relatively deep receptacle section.

When the front, back and the side wall panel members of the receptacle are in their proper relative positions in the mold and the mold closed, plastic structural member sections 36, 37, 38 and 39 are injection molded at all four corners of the receptacle and plastic structural member sections 33a, 34a and 35a injection molded along the top edges of side wall panel members 33, 34 and 35, in bonded relation with the marginal areas of the panel sections and preferably with the inner faces 40 of such structural members flush with the inner surfaces of the panel elements (see FIGS. 8 to 10 inclusive). For a substantial portion of the height of the container and at the rear corners thereof the flexible panel 32 and the plastic structural member sections 36 and 37 have the relationship shown in FIG. 10 wherein a portion of the plastic structural member section has an area in contact with a marginal portion of the panel 32 and to which the plastic member or section is bonded during the injection molding operation. This relationship exists up to a point somewhat below the top edge of the container receptacle where the panel section 32 is bent at right angles to present the intermediate panel section 31 which is devoid of structural plastic elements along its lateral edges. Panel section 30 is edged with a plastic structural member 41 which extends around the otherwise free edges thereof in the same manner as does the plastic angular member 17 with respect to panel 12 in FIGS. 1 and 2. The rear plastic structural member sections 36, 37 above the intermediate panel 31, is somewhat thicker than it is below the panel (compare FIG. 10 with FIGS. 8 and 9). Structural member sections 36, 37 continue with this increased thickness from the level of the intermediate panel member 31 up to the top edge of the container. The intermediate panel member 31 is bounded adjacent the container with a score line 42 enabling it to be bent upwardly to a position in which its inner marginal areas overlap and rest flush against the rear outer faces of the plastic structural member sections 36 and 37. Intermediate panel 31 is formed with another score line 43 demarking it from panel member 30 and this score line likewise permits the panel member 30, i.e. the lid top, to be bent downwardly to close the container in the same manner as did the lid in the embodiment previously described. When the lid section is in closed position, the container will be tight at its rear corners by virtue of the flush engagement of panel section 31 along its marginal edges with the rear faces of the angular members 36 and 37. If desired, intermediate panel 31 may be sealed along its marginal edges to the outer rear faces of plastic members 36 and 37 in the regions where they overlap. In use, then, the hinging action would be along score line 43. The previously described embodiment could be similarly modified.

In other respects, this container insofar as concerns the cooperation of the lid with the receptacle may be the same as that in the modification previously described.

The invention has been described in connection with the preferred embodiments thereof but many modifications are included within its spirit. It is to be limited therefore only by the scope of the appended claims.

What is claimed is:

1. A composite container including receptacle and lid portions formed from a unitary multisectional blank of flexible paneling material said receptacle portion comprising rigid plastic structural member sections injection molded into first frame means defining the shape of the receptacle portion at the top and bonded to at least one section of the paneling blank along a marginal edge thereof and said lid comprising rigid plastic structural member sections injection molded into second frame means independent of the first frame means and bonded to a different section of the same paneling blank along a marginal edge thereof, said first and second frame means being constructed and arranged to telescope one within the other in close juxtaposition when the receptacle is closed by the lid, and said paneling blank including a section intermediate the paneling sections of the receptacle and of the lid and which is devoid of plastic structure interconnecting the first and second frame means, said intermediate paneling section being bendable along a line enabling telescoping of the first and second frame means into said close juxtaposition, and said first frame means having portions thereof extending in a common plane toward each other to present opposed edges in spaced relation located inwardly from the lateral edges of said intermediate paneling section, said inwardly extending portions presenting frame edge means about which the intermediate panel section bends as it moves to receptacle closing position and frame face means against which said panel section engages facewise when it reaches lid closing position whereby completely to close the container when the first and second frame means are in juxtaposition.

2. A composite container according to claim 1 characterized in that the intermediate paneling section is hinged along a line parallel to and spaced downwardly from the upper edge of the receptacle portion of the container to give access to the interior of the container receptacle at a position below the upper edge thereof when the container lid is moved away from container closing position.

References Cited

UNITED STATES PATENTS

| | | | |
|---|---|---|---|
| 2,477,530 | 7/1949 | Vogt | 229—23 X |
| 2,506,056 | 5/1950 | Bergstein | 229—3.5 |
| 2,646,143 | 7/1953 | Daleo et al. | 229—44 X |
| 2,938,623 | 5/1960 | Eichorn | 229—23 X |
| 2,964,228 | 12/1960 | Cote et al. | 229—44 X |
| 3,104,012 | 9/1963 | Beamish | 229—2.5 X |
| 3,108,734 | 10/1963 | Hewko | 229—44 |
| 3,119,540 | 1/1964 | Schenk et al. | |
| 3,327,888 | 6/1967 | Chalmers et al. | 229—44 X |

DAVIS T. MOORHEAD, Primary Examiner

U.S. Cl. X.R.

229—2